United States Patent
Kurtz et al.

(10) Patent No.: US 7,183,620 B2
(45) Date of Patent: Feb. 27, 2007

(54) MOISTURE RESISTANT DIFFERENTIAL PRESSURE SENSORS

(75) Inventors: Anthony D. Kurtz, Saddle River, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/157,584

(22) Filed: Jun. 21, 2005

(65) Prior Publication Data

US 2006/0283257 A1 Dec. 21, 2006

(51) Int. Cl.
*H01L 29/84* (2006.01)

(52) U.S. Cl. .................. 257/419; 257/418; 257/417; 257/415

(58) Field of Classification Search .............. 257/414, 257/417, 418, 419, 420, 415
See application file for complete search history.

(56) References Cited

U.S. PATENT DOCUMENTS

| | | | | |
|---|---|---|---|---|
| 5,438,876 A * | 8/1995 | Lewis | .................. | 73/726 |
| 5,604,372 A * | 2/1997 | Yamaguchi | .................. | 257/417 |
| 6,330,829 B1 * | 12/2001 | Kurtz et al. | .................. | 73/717 |
| 6,424,017 B2 * | 7/2002 | Kurtz et al. | .................. | 257/419 |
| 6,450,039 B1 * | 9/2002 | Masuda | .................. | 73/756 |
| 6,523,415 B2 * | 2/2003 | Kurtz et al. | .................. | 73/727 |
| 6,813,956 B2 * | 11/2004 | Kurtz et al. | .................. | 73/754 |
| 7,057,247 B2 * | 6/2006 | Kurtz et al. | .................. | 257/419 |
| 2003/0107096 A1 * | 6/2003 | Kurtz et al. | .................. | 257/414 |

* cited by examiner

*Primary Examiner*—Evan Pert
*Assistant Examiner*—Victor A. Mandala, Jr.
(74) *Attorney, Agent, or Firm*—Plevy, Howard & Darcy, PC

(57) ABSTRACT

A differential pressure sensor has a semiconductor wafer having a top and bottom surface. The top surface of the wafer has a central active area containing piezoresistive elements. These elements are passivated and covered with a layer of silicon dioxide. Each element has a contact terminal associated therewith. The semiconductor wafer has an outer peripheral silicon frame surrounding the active area. The semiconductor wafer is bonded to a glass cover member via an anodic or electrostatic bond by bonding the outer peripheral frame to the periphery of the glass wafer. An inner silicon dioxide frame forms a compression bond with the glass wafer when the glass wafer is bonded to the silicon frame. This compression bond prevents deleterious fluids from entering the active area or destroying the silicon. The above described apparatus is mounted on a header such that through holes in the glass wafer are aligned with the header terminals. The header has pins which are directed from the header terminals to enable contact to be made to the unit. Both the top and bottom surfaces of the semiconductor wafer are coated with silicon dioxide which acts to protect all the elements from deleterious substances. Thus a first pressure is applied to one surface and a second pressure is applied to the other surface to enable differential operation.

10 Claims, 5 Drawing Sheets

MOISTURE RESISTANT DIFFERENTIAL PRESSURE SENSORS

FIELD OF THE INVENTION

The present invention relates to pressure transducers, and more particularly to a moisture resistant differential pressure transducer employing leadless construction for operation in harsh environments.

BACKGROUND OF THE INVENTION

Certain types of pressure sensors are designated as "leadless" sensors. The designation "leadless" arises from the fact that these pressure transducers are fabricated such that they can make contact with a header by means of internal contacts instead of typical wire leads. An example of such a leadless pressure sensor is depicted in U.S. Pat. No. 5,955,771 issued on Sep. 21, 1999 entitled "Sensor for Use in High Vibrational Applications and Methods for Fabricating the Same" to A. D. Kurtz et al. Such leadless pressure sensors as depicted in the above noted patent are capable of operating in many harsh environments and basically are moisture resistant. These capabilities are attributed to having only the micro machined side of the sensor, containing no active elements, exposed to the operating environment. This side, being comprised substantially only of silicon can thus withstand numerous harsh environmental conditions, including high temperature, corrosive, oxidizing, and conductive media. The other side of the sensor containing the piezoresistive network is hermetically sealed within a vacuum cavity. FIG. 1 depicts an absolute leadless transducer assembly according to the prior art. As one can ascertain from FIG. 1 the sensor chip 10 is located in such a manner that a pressure P is applied to the backside of the diaphragm. The pressure or piezoresistive elements 16 are contained within a vacuum cavity 12 which is formed between the sensing chip 10 and the glass wafer 17. The entire assembly as shown is coupled to a glass header 13 where header pins 14 and 15 make contact with the contacts of the sensing chip 10. The piezoresistive sensors 16 are located within the vacuum cavity 12 and a pressure is applied to the rear side or back of the diaphragm as that side opposite to the side containing the piezoresistor 16.

FIG. 2 illustrates another prior art pressure sensor operative as a differential sensor. The same reference numerals have been utilized in FIG. 2 as in FIG. 1 to denote corresponding elements. Essentially the sensor chip 10 includes a silicon wafer which is bonded to a glass wafer 17. In the case of the unit in FIG. 2 it is seen that a first pressure is applied to the diaphragm side of the sensing element designated as $P_1$. A through hole 18 accommodates a reference tube 19 allowing a pressure $P_2$ to be applied to the other side of the sensor element 10. This side of the sensor element contains the piezoresistive elements 16. Thus, in the embodiment shown in FIG. 2 the piezoresistive elements 16 are directly exposed to the environment in which the pressure $P_2$ is present. It is of course understood that such a differential device as depicted in FIG. 2 would utilize the harsh environment associated with $P_1$ to be exposed to the underside of the diaphragm and hence to be removed from the piezoresistive sensors 16. However in order to obtain a true differential operation of the sensor 10 and to obtain complete environmental protection both sides of the sensor 10 should be protected from the environment.

SUMMARY OF THE INVENTION

A differential pressure sensor apparatus comprises a semiconductor wafer having a top and bottom surface. The top surface of the wafer has a central active area containing piezoresistive elements and having contact terminals each associated with and connected to an associated piezoresistive element. An insulating layer covers the active area and the piezoresistive elements, with a peripheral semiconductor frame surrounding the active area and an inner frame layer also surrounding the active area and fabricated from an insulating material. A glass cover member having a central aperture for communicating with the active area is anodically or electrostatically bonded to the semiconductor wafer at the peripheral semiconductor frame with the inner insulating frame forming a compression bond with the glass cover member. The glass member includes contact through holes, each associated and communicating with an associated contact terminal of the semiconductor wafer, when the cover member is bonded to the wafer.

DETAILED DESCRIPTION OF THE INVENTION

Figure 1:
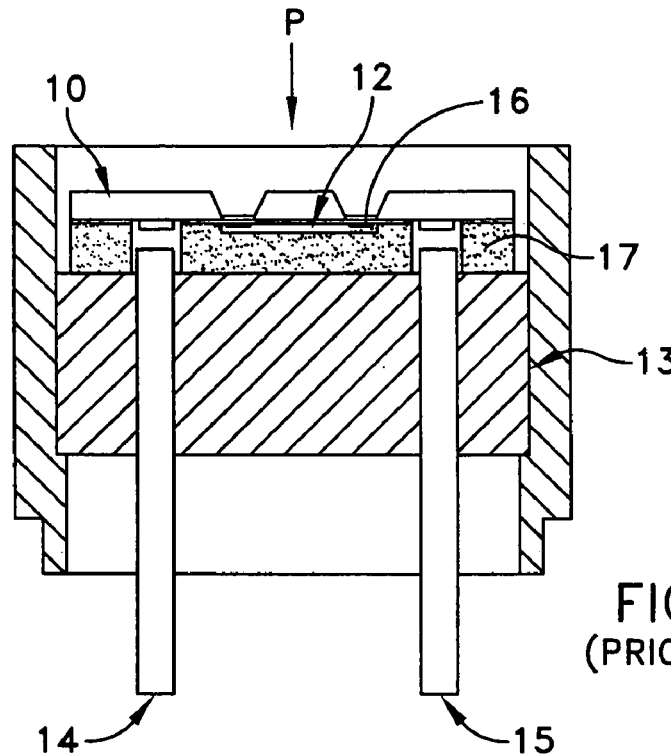
FIG. 1 depicts a prior art absolute leadless transducer assembly useful to explain this invention.
Figure 2:
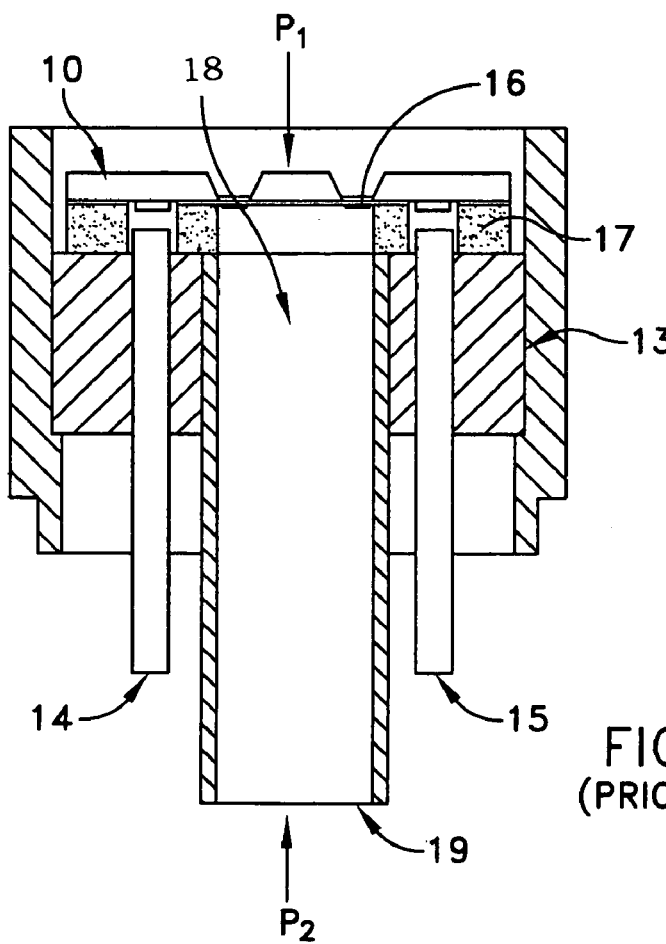
FIG. 2 depicts a prior art configuration of a differential leadless transducer assembly useful to explain the operation of this invention.

As noted above in order to obtain a true differential operation of a pressure sensor, the header onto which the leadless sensing chip is to be mounted contains a reference tube such as reference tube 19 shown in FIG. 2. As seen in prior art FIG. 2, when the leadless chip 10 is to be mounted over such an opening, a hole must be present in the glass wafer 17 and located to accommodate the opening of the tube 19. The piezoresistors 16 are thus exposed to one environment associated with the pressure $P_2$. The mounting process for leadless assembly is as described in the above noted U.S. Pat. No. 5,955,771. The leadless sensor chip is mounted and true differential header pressures are applied to the sensor chip from either side as shown in FIG. 2.

In order to protect the side containing the sensing element, a novel approach for sensor fabrication will be described. The approach to be described relies on the incorporation of a silicon dioxide layer used to passivate the piezoresistive network. The silicon layer passivates the network in the areas which are exposed to the pressure media, while accommodating silicon dioxide free areas in the regions required for facilitating hermetic, molecular, bonds. A novel bonding approach is used to attach the appropriate glass cover member to the silicon sensor chip to produce a composite leadless sensor chip.

Figure 3:
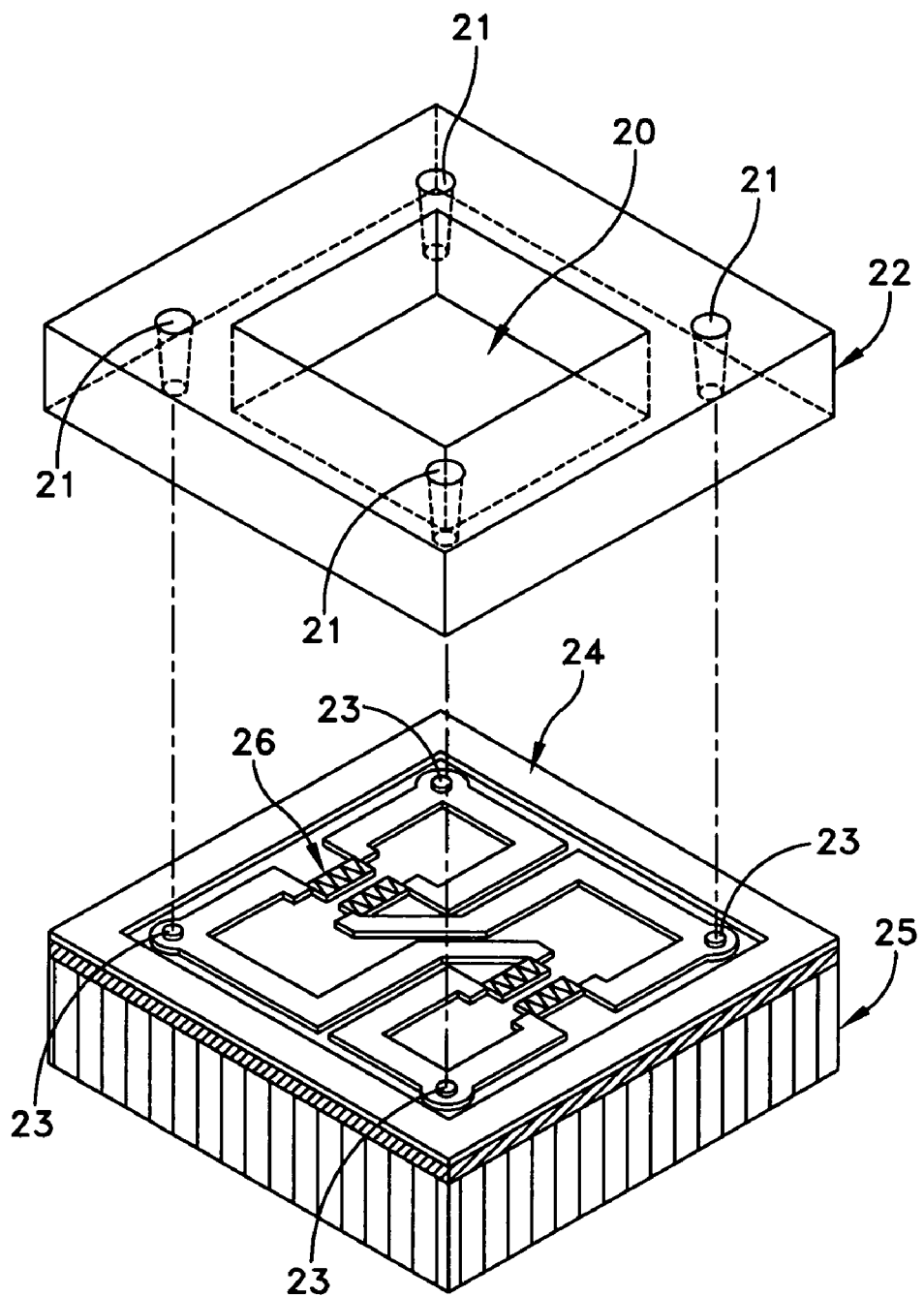
FIG. 3 depicts an isometric view of a silicon chip structure and a glass cover member according to this invention.

Referring to FIG. 3 there is shown a sensor chip 25 which essentially contains an extending peripheral rim on outer frame 24 which rim 24 will enable a hermetic seal. Sensor chip has contact regions indicated as 23 which essentially are four in number. There is a contact 23 in each corner. The piezoresistive sensing network is designated by numeral 26. Shown above the sensor chip 25 is a glass cover member 22 having a central aperture 20. The glass cover member 22 has contact through holes 21 which essentially co-act with an associated contact region 23 on the chip 25 as shown with each hole 21 located at each corner of the glass cover member 22. The numerals 21 and 23 have been used to designate the four equivalent elements. The glass cover member 22 is bonded to the semiconductor chip using well-known bonding approaches. For example, an electrostatic or anodic bond is obtained when silicon and glass (such as borosilicate glass having low expansion properties) are placed together and exposed to a combination of heat and voltage. The voltage enables the free oxygen to molecularly bond to the underlying silicon. The silicon dioxide films are ordinarily removed from the silicon regions being anodically or electrostatically bonded.

Figure 4:
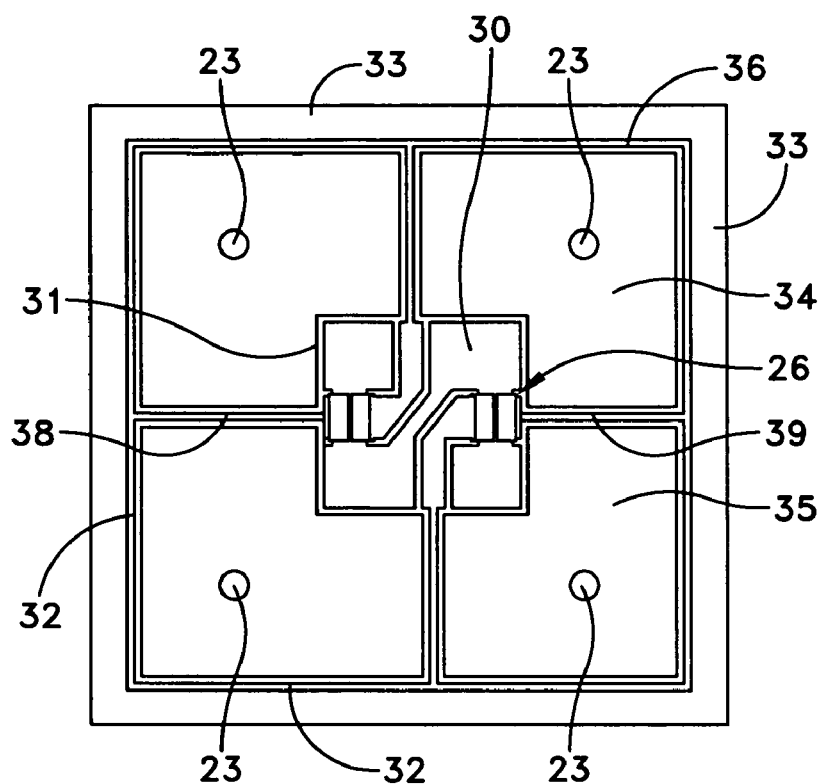
FIG. 4 is a top plan view of a silicon sensor configuration employed with this invention.

Referring to FIG. 4 there is shown a top plan view of a sensor layout which is employed in this invention. The sensing area is designated by reference numeral 30 and is the area which contains the piezoresistors. A layer of silicon dioxide coats the entire top surface of the sensor element including the sensor area 30. Also coated with silicon dioxide are areas 32, 33, 34, 35, 36. The silicon dioxide is now removed from areas 33, 34, 35 which are the areas that are going to be bonded to the glass cover member 22 of FIG. 3.

Figure 5:
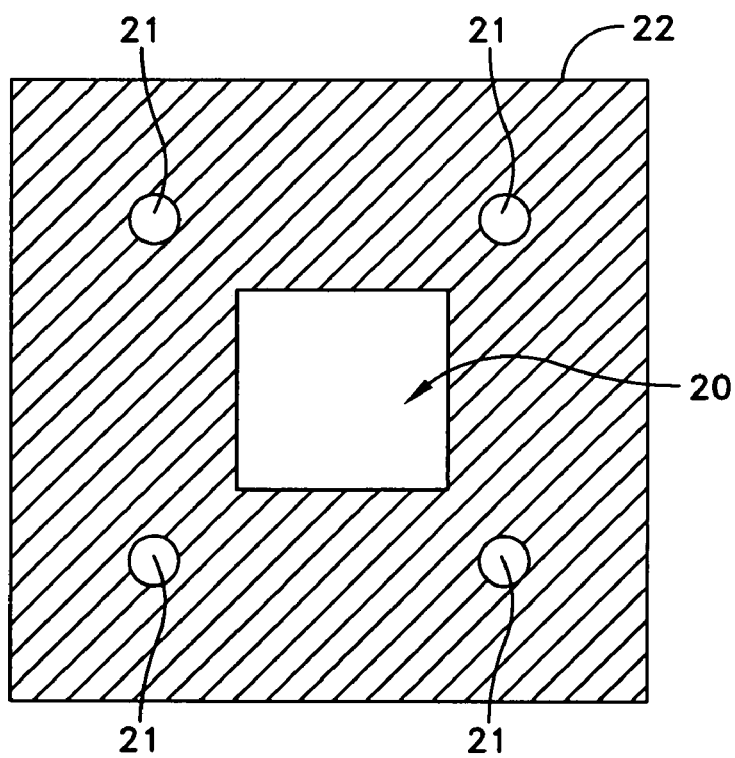
FIG. 5 is a top plan view of a glass cover member utilized in this invention.

The glass cover member 22 is shown in a top plan view in FIG. 5. The removal of silicon dioxide by conventional musking techniques and etches is well known. The silicon dioxide is removed from all areas with the exception of areas 31, 32 and 36. Thus as one can see there remains a frame 31 of silicon dioxide about the sensing area 30. Areas such as 38 and 39 are also coated with silicon dioxide and the silicon dioxide is not removed from those areas. The frame or rim 24 of FIG. 3 is shown in FIG. 4 as area 33.

As shown in FIG. 5 the glass wafer has a central through hole 20 as well as the contact through holes 21. There are shown four contact through holes 21, one in each corner. As indicated the wafer 25 after removal of the silicon dioxide in the various areas (FIG. 4) is now bonded to the glass wafer 22 as shown in FIGS. 4 and 5. The novel approach associated with this invention depicts a structure that introduces a silicon dioxide layer 30 over the entire sensing network 26. Thus the entire sensing area is covered with a layer of silicon dioxide 30. The silicon dioxide which coated the entire chip is removed from the regions to be bonded but a narrow lip of silicon dioxide remains about these regions. This narrow lip is defined by reference numerals 32, 36. The narrow lip of silicon dioxide is not intended to form an anodic bond but is intended to form a compression bond to prevent the conductive fluids from contacting any of the exposed silicon patterns. When the frame or rim 33 is bonded to the glass wafer 22, the coated areas 32 and 36 compress as they are raised and henceforth seal the chip 25 to the wafer 22 by forming a compression seal or bond.

Figure 6:
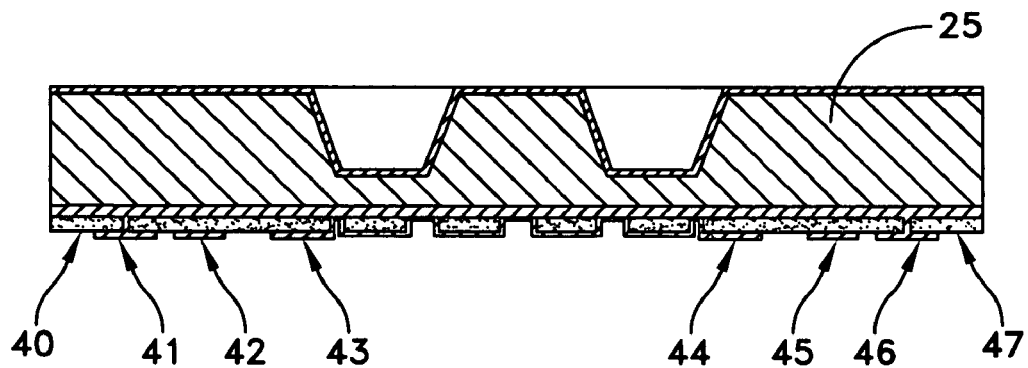
FIG. 6 is a cross sectional view of a silicon sensor employed in this invention.

Referring to FIG. 6 there is shown a cross sectional view of the sensor chip 25 according to this invention. As seen the silicon sensor chip 25 has an outer hermetic rim 40, which rim 40 and 47 define a hermetic seal. The rim 40 and 47 is depicted in FIG. 4 by for example reference numeral 33. The silicon rim of frame 33 is formed about the periphery of the silicon chip 25. The silicon dioxide layers are depicted by reference numerals 41 and 46. This forms an inner frame also about the active area of the sensor which is formed from the silicon dioxide. The inner frame 41 and 46 as frame members 32 and 36 of FIG. 4 are layers of silicon dioxide. These layers are raised with respect to the outer frame or rim 33 (rim 24 of FIG. 3). When the semiconductor wafer 25 is electrostatically bonded to the glass wafer 22, these areas of silicon dioxide compress to form compression seals or bonds to further protect the piezoresistors 26 and associated components. The active area of the sensor is surrounded by the frame constituting silicon dioxide layers 43 and 44 of FIG. 6 corresponding to frame 31 of FIG. 4. Metal contacts 42 and 45 associated with the silicon sensor and contact the associated piezoresistors. The layer of silicon dioxide 43 and 44 essentially covers the active area 30 which includes the piezoresistors 26.

Figure 7:
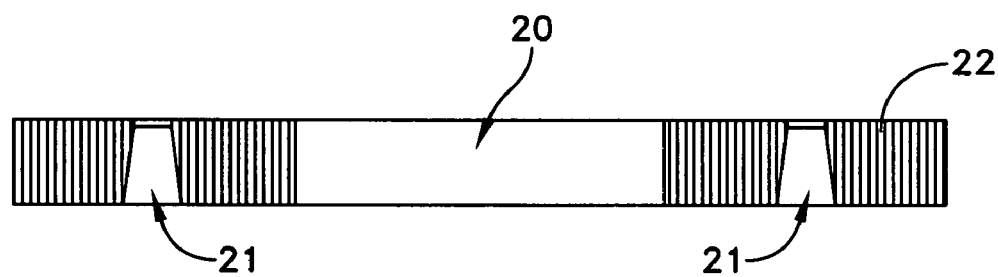
FIG. 7 is a cross sectional view of a glass wafer according to this invention.
Figure 8:
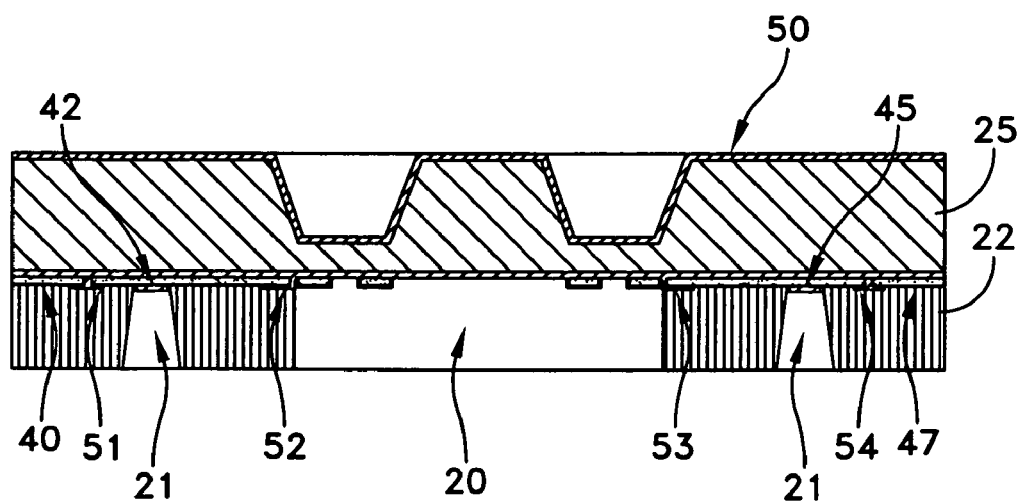
FIG. 8 is a cross sectional view of a glass wafer of FIG. 7 bonded to the silicon sensor of FIG. 6.

Referring to FIG. 7 there is shown a cross sectional view of the glass cover wafer 22 depicting the central through hole 20 for application of pressure and the through contact holes 21. The contact holes 21 eventually align with the metal contacts 42 and 45. It is of course understood there are four contacts associated with the sensor chip. As depicted in FIG. 8 the semiconductor sensor chip 25 is now bonded to the glass cover member 22. The contacts 42 and 45 associated with the sensor are each positioned within a contact hole 21 associated with the glass wafer. In this manner contacts 42 and 45 can be accessed via the through holes 21. Silicon dioxide regions are referenced by numerals 41, 43, 44 and 46 the hermetic rim portions are shown and referenced by reference numerals 40 and 47. As seen that these reference numerals have been utilized in both FIG. 6 and FIG. 7 with the exception of the silicon dioxide areas. The through hole 20 enables the sensor to interface with an alternate pressure source.

As seen in FIG. 8 once the cover member 22 is bonded to the silicon chip 25 a hermetic seal is formed where the sensing diaphragm can only be exposed to the sensing media via the through hole 20. Furthermore, the micro machined side not containing the sensor network is also guarded with a layer of silicon dioxide for additional protection against the media applied from that side. This leadless differential sensor is then mounted onto an appropriate header and all areas of the sensor exposed to any sensing pressure, including the pressure entering the reference side or the front side, are fully covered by the passivating layer of silicon dioxide. Therefore the entire pressure sensor is capable of exposure to moisture and to other types of conductive or harsh media without damage to the sensing devices. In FIG. 8 of the silicon dioxide layers forming the frame are referenced by numerals 51, 52, 53, 54. The active area of the chip is surrounded by the silicon dioxide peripheral frame including silicon dioxide layers 52 and 53. A compression bond is formed. This frame is depicted in FIG. 4 by silicon dioxide frame 31. The layers 51 and 54 create the inner frame including sides 32 and 36 which is an inner frame with respect to the outer frame or rim 33. A compression bond is formed by the inner frame arms 32 and 36 as well.

Figure 9:
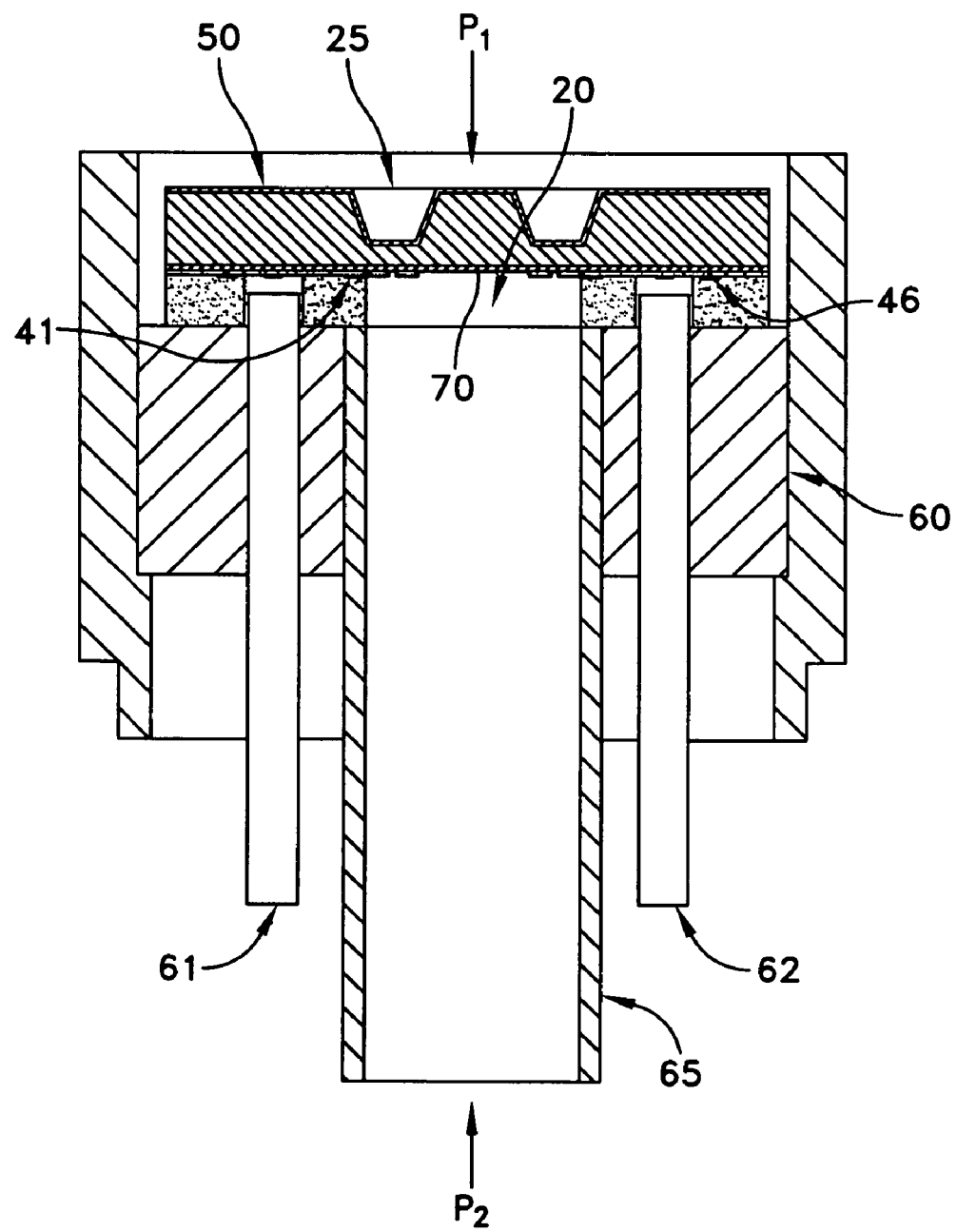
FIG. 9 is a cross sectional view of a differential leadless transducer according to this invention.

Referring to FIG. 9 there is shown a cross sectional view of the completed pressure transducer according to an aspect of the present invention. As one can see a first pressure is applied to the top surface of the sensor the pressure is designed as $P_1$ The top surface of the sensor is coated with a layer of silicon dioxide 50. A second pressure $P_2$ is applied by a reference tube 65 to the bottom side of the sensor assembly via the through hole 20 in the glass cover member 22. This through hole communicates with the active region of the sensor which is indicated is fully coated with a layer of silicon dioxide. The reference numerals 41 and 46 denote the areas of silicon dioxide whereby the reference numeral 70 denotes the fact that the entire active area of the sensor is also coated with silicon dioxide. The entire assembly is contained in a glass header 60 which has pins 61 and 62, which pins communicate with the contacts on the sensor chip. The contacts can be directly connected to the pins by means of a suitable conductive material emplaced within the apertures associated with the glass wafer. The sensor depicted in FIG. 9 is virtually completely immune to harsh environments associated with various media due to the coating of the sensitive areas of the device by layers of silicon dioxide and the bonds.

Thus, a differential pressure sensor has a semiconductor wafer having a top and bottom surface. The top surface of the wafer has a central active area containing piezoresistive elements. These elements are passivated and covered with a layer of silicon dioxide. Each element has a contact terminal associated therewith. The semiconductor wafer has an outer peripheral silicon frame surrounding the active area. The semiconductor wafer is bonded to a glass cover member via an anodic or electrostatic bond by bonding the outer peripheral frame to the periphery of the glass wafer. An inner silicon dioxide frame forms a compression bond with the glass wafer when the glass wafer is bonded to the silicon frame. This compression bond prevents deleterious fluids from entering the active area or destroying the silicon. The above described apparatus is mounted on a header such that through holes in the glass wafer are aligned with the header terminals. The header has pins which are directed from the header terminals to enable contact to be made to the unit. Both the top and bottom surfaces of the semiconductor wafer are coated with silicon dioxide which acts to protect all the elements from deleterious substances. Thus a first pressure is applied to one surface and a second pressure is applied to the other surface to enable differential operation.

It is to be understood that the form of this invention as shown is merely a preferred embodiment. It will be apparent to those skilled in the art that various features and alternative embodiments can be envisioned. Furthermore, various other changes may be made in the function and arrangement of parts; equivalent means may be substituted for those illustrated and described; and certain features may be used independently from others, all without departing from the spirit and scope of the invention as defined in the following claims.

What is claimed is:

1. A differential pressure sensor apparatus, comprising:
   a semiconductor wafer having a top surface and a bottom surface, said top surface having a central active area containing a plurality of piezoresistive elements, a plurality of contact terminals, each of said contact terminals associated with and connected to a piezoresistive element, a solid insulating layer covering said active area and said piezoresistive elements, a peripheral semiconductor frame surrounding said active area, and an insulating inner frame layer also surrounding said active area; and
   a glass cover member having a central aperture for communicating with said active area, said glass cover member electrostatically bonded to said wafer at said peripheral semiconductor frame, with said inner frame forming a compression bond with said glass wafer, said glass wafer having contact through holes each associated and communicating with an associated contact terminal when said cover member is bonded to said wafer.

2. The differential pressure sensor apparatus according to claim 1 further including:
   a layer of insulating material covering said bottom surface of said wafer.

3. The differential pressure sensor apparatus according to claim 1 wherein said semiconductor wafer is silicon and said insulating layer is silicon dioxide.

4. The differential pressure sensor apparatus according to claim 1 wherein said contact terminals are metal contact terminal.

5. The differential pressure sensor apparatus according to claim 1 further including a reference tube coupled about said central aperture of said glass cover member to receive a first pressure at said top surface, whereby when a second pressure is applied to said bottom surface said piezoresistive elements deflect to provide a signal output indicative of the difference between said first and second pressures.

6. The differential pressure sensor apparatus according to claim 1 further comprising:
   a header coupled to said glass wafer and surrounding said central aperture, said header having an aperture communicating with said central aperture and having a plurality of pins extending therefrom and extending into an associated contact through hole to enable contact with said contact terminals of said semiconductor wafer.

7. The differential pressure sensor apparatus according to claim 1 wherein said semiconductor wafer is generally rectangular.

8. The differential pressure sensor apparatus according to claim 7 wherein said glass cover member is rectangular and relatively congruent with said semiconductor wafer.

9. The differential pressure sensor apparatus according to claim 1 wherein said glass cover member is fabricated from borosilicate glass.

10. The differential pressure sensor according to claim 8 wherein both said semiconductor peripheral frame and said inner frame are rectangular and coaxial.

* * * * *